US011754050B2

(12) United States Patent
Madsen et al.

(10) Patent No.: US 11,754,050 B2
(45) Date of Patent: Sep. 12, 2023

(54) MODULAR TOWER DAMPER SYSTEM

(71) Applicant: Vestas Wind Systems A/S, Aarhus N. (DK)

(72) Inventors: Søren Bøgelund Madsen, Aarhus N (DK); Tue Hald, Hadsten (DK)

(73) Assignee: Vestas Wind Systems A/S, Aarhus N (DK)

( * ) Notice: Subject to any disclaimer, the term of this patent is extended or adjusted under 35 U.S.C. 154(b) by 172 days.

(21) Appl. No.: 17/312,657

(22) PCT Filed: Dec. 11, 2019

(86) PCT No.: PCT/DK2019/050383
§ 371 (c)(1),
(2) Date: Jun. 10, 2021

(87) PCT Pub. No.: WO2020/125886
PCT Pub. Date: Jun. 25, 2020

(65) Prior Publication Data
US 2022/0049682 A1     Feb. 17, 2022

(30) Foreign Application Priority Data

Dec. 20, 2018  (DK) .......................... PA 2018 70846

(51) Int. Cl.
*F03D 80/80*     (2016.01)
*F03D 13/20*     (2016.01)
(Continued)

(52) U.S. Cl.
CPC ........... *F03D 13/20* (2016.05); *F03D 7/0296* (2013.01); *F03D 80/88* (2016.05); *F16F 7/1034* (2013.01);
(Continued)

(58) Field of Classification Search
CPC ........ F03D 13/20; F03D 7/0296; F03D 80/88; F16F 7/1034; F05B 2240/912; F05B 2260/964; Y02E 10/72; Y02E 10/728
See application file for complete search history.

(56) References Cited

U.S. PATENT DOCUMENTS 11,560,878 B2 *   1/2023   Madsen ................. F03D 17/00
2006/0147306 A1   7/2006   Zheng et al.
(Continued)

FOREIGN PATENT DOCUMENTS

| CN | 1247890 C | 3/2006 |
| CN | 104806449 A | 7/2015 |

(Continued)

OTHER PUBLICATIONS

European Patent Office, Examination Report in 19821247.4, dated Sep. 19, 2022.

(Continued)

*Primary Examiner* — Aaron R Eastman
(74) *Attorney, Agent, or Firm* — Wood Herron & Evans LLP

(57) ABSTRACT

The present invention relates to a damper module adapted to be secured to a wind turbine tower section, the damper module comprising at least one liquid damper secured to a frame structure, wherein each liquid damper comprises a container comprising an interior volume containing an amount of liquid, wherein the amount of liquid in the interior volume of the container sets a natural frequency of the liquid damper, and wherein the frame structure comprises an interface arrangement configured for, in cooperation with a damper module suspension arrangement in a tower section, securing the damper module to said tower section, and a liquid damper fastening arrangement configured for securing said at least one liquid damper to the frame structure. The present invention further relates to a liquid damper and (Continued)

a tower section having at least one damper module secured thereto.

20 Claims, 12 Drawing Sheets

(51) Int. Cl.
*F03D 7/02* (2006.01)
*F16F 7/10* (2006.01)

(52) U.S. Cl.
CPC ... *F05B 2240/912* (2013.01); *F05B 2260/964* (2013.01)

(56) References Cited

U.S. PATENT DOCUMENTS

| | | | | |
|---|---|---|---|---|
| 2012/0063915 | A1* | 3/2012 | Kawabata | F03D 80/00 416/244 R |
| 2015/0321826 | A1* | 11/2015 | Bouffand | B65D 1/023 425/522 |
| 2016/0252079 | A1* | 9/2016 | Ollgaard | F03D 7/0296 52/745.17 |
| 2019/0063063 | A1* | 2/2019 | Mechineau | E04H 9/0215 |
| 2019/0219030 | A1* | 7/2019 | Munk-Hansen | F03D 80/80 |
| 2019/0353218 | A1* | 11/2019 | Berry | F16F 9/096 |
| 2019/0360471 | A1* | 11/2019 | Øllgaard | F16F 7/10 |
| 2020/0332548 | A1* | 10/2020 | Mortensen | F16F 7/116 |
| 2020/0355166 | A1* | 11/2020 | Mortensen | F03D 80/00 |
| 2020/0378466 | A1* | 12/2020 | Madsen | F16F 15/022 |
| 2021/0190039 | A1* | 6/2021 | San Vicente Larrechi | F03D 17/00 |
| 2021/0254605 | A1* | 8/2021 | Madsen | F03D 17/00 |
| 2021/0269126 | A1* | 9/2021 | Allen | B63B 39/02 |
| 2022/0196103 | A1* | 6/2022 | Liebman | F16F 7/10 |
| 2022/0412424 | A1* | 12/2022 | Tophoj | F16F 7/104 |
| 2023/0003188 | A1* | 1/2023 | Vermillion | F03D 9/32 |
| 2023/0020641 | A1* | 1/2023 | Sloth | F03D 1/0675 |

FOREIGN PATENT DOCUMENTS

| | | | |
|---|---|---|---|
| CN | 108561487 A | 9/2018 | |
| CN | 108894571 A | 11/2018 | |
| DE | 4215402 A1 | 11/1993 | |
| EP | 0580451 A1 | 1/1994 | |
| EP | 1677003 A2 | 7/2006 | |
| EP | 1855000 A1 | 11/2007 | |
| EP | 2899397 A1 | 7/2015 | |
| EP | 3048295 A1 | 7/2016 | |
| KR | 101541490 B1 | 8/2015 | |
| WO | 0077394 A1 | 12/2000 | |
| WO | WO-02084114 A1 * | 10/2002 | F03D 80/00 |
| WO | 2015062608 A1 | 5/2015 | |
| WO | 2015171096 A1 | 11/2015 | |

OTHER PUBLICATIONS

Danish Patent and Trademark Office, Search and Examination Report in PA 2018 70846, dated Jun. 17, 2019.
European Patent Office, International Search Report and Written Opinion in PCT Application No. PCT/DK2019/050383, dated Feb. 11, 2020.
China National Intellectual Property Administration, Office Action issued in corresponding Chinese Patent Application No. 201980084304.1, dated Apr. 28, 2023, with English translation.

* cited by examiner

MODULAR TOWER DAMPER SYSTEM

FIELD OF THE INVENTION

The present invention relates to a modular tower damper system for damping Vortex and/or operational induced oscillations of wind turbine towers. The present invention relates in particular to a modular tower damper system where the overall mass and the natural frequency of the damper system can be easily adjusted.

BACKGROUND OF THE INVENTION

Vortex shedding of in particular wind turbine towers is a well-known phenomenon that occurs due to instability of the flow around such towers. Low-pressure vortices are created on the downstream side of the tower and intermittently detach from either side of the tower. The wind turbine tower will tend to move towards the low pressure, i.e. an alternating force is applied to the tower. The frequency by which the force alternates from side to side depends on the diameter of the wind turbine tower and the wind speed. At the so-called critical wind speed the frequency of the alternating forces coincides with the natural frequency of the wind turbine tower which then starts to oscillate.

The amplitudes of the oscillations at the critical wind speeds depend on the structural damping of the wind turbine tower. If no additional damping is added to the wind turbine tower the oscillations can result in severe deflections of the wind turbine tower. This may lead to structural damage and/or damage to equipment or personnel in the wind turbine tower.

In order to provide proper damping of the wind turbine tower the total mass of the damping system as well as the natural frequency of the damping system must be selected taking the properties of the wind turbine tower into account.

It may therefore be seen as an objective of the present invention to provide a tower damper system where the total mass of the damper system can be easily adjusted.

It may be seen as a further objective of the present invention to provide a tower damper system where the natural frequency of the damper system can be easily adjusted.

It may be seen as an even further objective of the present invention to provide a tower damper system that may be retrofitted to existing wind turbine installations without interfering with the existing installation.

DESCRIPTION OF THE INVENTION

The above-mentioned objects are complied with by providing, in a first aspect, a damper module adapted to be secured to a wind turbine tower section, the damper module comprising at least one liquid damper secured to a frame structure, wherein each liquid damper comprises
  a container comprising an interior volume containing an amount of liquid, wherein the amount of liquid in the interior volume of the container sets a natural frequency of the liquid damper
  and wherein the frame structure comprises
  an interface arrangement configured for, in cooperation with a damper module suspension arrangement in a tower section, securing the damper module to said tower section, and
  a liquid damper fastening arrangement configured for securing said at least one liquid damper to the frame structure.

Thus, in a first aspect the present invention relates to a damper module adapted to be secured to a wind turbine tower section. The wind turbine tower section may form part of a wind turbine tower comprising a plurality of tower sections arranged on top of each other. The wind turbine tower may be a complete wind turbine tower or a partly completed wind turbine tower. The complete wind turbine tower may have a nacelle installed on its top, the nacelle with or without rotor. Alternatively, the wind turbine tower section may be a discrete tower section which does not form part of an assembled wind turbine tower. The tower section may comprise a tubular tower wall and upper and lower flanges configured to secure the tower section to other tower sections.

As already mentioned the liquid damper comprises a container comprising an interior volume containing an amount of liquid. The amount of liquid in the interior volume of the container sets a natural frequency of the liquid damper. In order to achieve a sufficient damping of a tower structure the natural frequency of the liquid damper may be selected so that it approximately matches the natural frequency of the tower structure. As the liquid damper of the fourth aspect may be intended to dampen vibrations in wind turbine towers, or sections thereof, the natural frequency of the liquid damper may be below 5 Hz, such as between 0.5 Hz and 2 Hz.

In terms of manufacturing, the container may be a one-piece moulded barrel being manufactured using an appropriate moulding technique, such as a rotational moulding technique.

In an embodiment the container further comprises at least one embedded flow restraining element arranged within the interior volume.

When the wind turbine tower section starts to oscillate, the liquid will start sloshing from side to side inside the interior volume. With a properly tuned damper the liquid moves out of phase with the tower section. A restoring force in the fluid is due to gravity. When the fluid is sloshing out of phase with the tower section and there are flow losses, the energy is taken of the combined system and this will effectively reduce or cancel the oscillations of the tower section.

The flow restraining element restricts the movement of the liquid inside the container and thereby increases the amount of energy taken out of the combined system.

To ensure proper fixation and positioning of the at least one embedded flow restraining element at least one indent is provided within the interior volume of the container, and wherein the positioning of the at least one embedded flow restraining element is aligned with the at least one indent. The at least one indent may be provided in a cylindrically shaped inner surface portion of the container. Preferably, a set of angularly spaced indents in the cylindrically shaped inner surface portion secures each embedded flow restraining element to the container. The embedded flow restraining element may be a ring-shaped element having a mesh of through-going passages as well as a central opening.

The interface arrangement of the frame structure may comprise a first set of fastening means configured for securing the damper module relative to a tower section in an axial direction of said tower section. The first set of fastening means may comprise one or more eye bolts. The damper module may be secured in an axial direction of the tower section by suspending the damper module from a tower flange in an appropriate number of elongated elements, such as an appropriate number of wires.

The interface arrangement of the frame structure may further comprise a second set of fastening means configured for securing the damper module relative to a tower section in a radial direction of said tower section. The second set of fastening means may comprise one or more magnetic fastening elements configured to secure the damper module to an inside of the tower section wall which may be a tubular steel tower wall. Each of the one or more magnetic fastening elements may comprise a number of permanent magnets, such as 2 permanent magnets.

The interface arrangement of the frame structure may further comprise a third set of fastening means configured for attaching an axially adjacent damper module to the damper module in a manner so that the axially adjacent damper module is suspended from the damper module in the axial direction of said tower section. The third set of fastening means may comprise one or more eye bolts. An axially adjacent damper module may be attached to the damper module via an appropriate number of elongated elements, such as an appropriate number of wires.

The damper module may comprise a plurality of liquid dampers secured to the frame structure, wherein the plurality of liquid dampers have essentially the same natural frequency. The natural frequency of the plurality of liquid dampers may be below 5 Hz, such as between 0.5 Hz and 2 Hz.

In a second aspect the present invention relates to a tower section for a wind turbine tower, said tower section comprising a tubular tower wall, upper and lower flanges and at least one damper module according to the first aspect.

The tower section may be of the type addressed in connection with the first aspect, i.e. a tower section forming part of a complete or a partly completed wind turbine tower comprising a plurality of tower sections arranged in top of each other or a discrete tower section which does not form part of an assembled wind turbine tower. The discrete tower section may be installed as part of an assembled wind turbine tower at a later stage. The arrangement of the damper module in the discrete tower section may be performed in a preassembly site at the tower factory or the damper factory or at the construction site of the tower. In the first two examples mentioned here, the damper module is transported inside the tower section to the construction site.

The least one damper module may be positioned adjacent the tower wall on an inside of the tower section. The tower wall may be a tubular steel tower wall of the tower section.

The tower section may comprise a damper module suspension arrangement for suspending a number of said at least one damper module. The damper module suspension arrangement may comprise at least one elongated element, wherein the at least one elongated element is attachable to the interface arrangement, and attachable to connection points on the tower section. The at least one elongated element may comprise at least one wire. The interface arrangement of the damper module may be implemented as discussed in connection with the first aspect. The connection points on the tower section may be formed on the inside of the tower wall of the tower section, on the upper flange of the tower section or on a tower platform suspended within the tower section.

In a third aspect the present invention relates to a wind turbine tower comprising a tower section according to the second aspect, wherein said tower section forms part of an upper half of the wind turbine tower. The wind turbine tower may form part of an assembled wind turbine generator at least comprising the wind turbine tower and a nacelle installed thereon, the nacelle with or without rotor. Alternatively, the wind turbine tower may be a free standing tower structure without a nacelle installed thereon. A free standing tower structure may be a tower structure during storage, a tower structure under transportation or a tower structure at its final installation site.

For example, during transportation on a seagoing vessel or when the vessel has jacked up the tower structure may be fully assembled and free standing on the vessel. The damper module may thus be in operation during transportation or storage (during jack up) to mitigate the effects of vortex shedding.

In a fourth aspect the present invention relates to a liquid damper comprising a container comprising an interior volume containing an amount of liquid, the container further comprising at least one embedded flow restraining element arranged within the interior volume, wherein the amount of liquid in the interior volume of the container sets a natural frequency of the liquid damper. In order to achieve a sufficient damping of a tower structure the natural frequency of the liquid damper may be selected so that it approximately matches the natural frequency of the tower structure. As the liquid damper of the fourth aspect may be intended to dampen vibrations in wind turbine towers, or sections thereof, the natural frequency of the liquid damper may be below 5 Hz, such as between 0.5 Hz and 2 Hz.

In terms of manufacturing the container may be a one-piece moulded barrel being manufactured using an appropriate moulding technique, such as a rotational moulding technique.

To ensure proper fixation and positioning of the at least one embedded flow restraining element at least one indent is provided within the interior volume of the container, and wherein the positioning of the at least one embedded flow restraining element is aligned with the at least one indent. The at least one indent may be provided in a cylindrically shaped inner surface portion of the container. Preferably, a set of angularly spaced indents in the cylindrically shaped inner surface portion secures each embedded flow restraining element to the container. The embedded flow restraining element may be a ring-shaped element having a mesh of through-going passages as well as a central opening.

In a fifth aspect the present invention relates to a method for manufacturing a container for a liquid damper, the method comprising the steps of providing at least one flow restraining element and embedding the at least one flow restraining element in an interior volume of the container using a rotational moulding technique. The container may take the form of a one-piece moulded barrel. The properties of the manufactured container may be as addressed in connection with the fourth aspect.

In a sixth aspect the present invention relates to a damper module chain comprising a plurality of mutually connected damper modules according to the first aspect, wherein axially adjacent damper modules are mutually connected via at least one elongated element. The at least one elongated element may comprise at least one wire.

In a seventh aspect the present invention relates to a tower section for a wind turbine tower, said tower section having at least one damper module chain according to the sixth aspect secured thereto. The securing of the at least one damper module chain may be provided via the interface arrangements of the respective damper modules as addressed above.

The tower section may be transported to the wind turbine tower construction site with the at least one damper module chain installed.

In an eight aspect the present invention relates to a method for installing a damper module chain according to the sixth aspect in an installed wind turbine tower, the method comprising the steps of a) hoisting the damper module chain to a predetermined height inside a wind turbine tower using a hoisting arrangement secured to the interface arrangement of the frame structure, b) load shifting the hoisted damper module chain from the hoisting arrangement to the suspending arrangement also secured to the interface arrangement at one end, and secured to a wind turbine tower flange at another end, wherein the suspension arrangement is secured to the wind turbine tower flange at a connection point which is above and vertically aligned with a final position of the damper module chain, and c) bringing, using the suspension arrangement, the damper module chain to its final vertical position, and securing it to a wind turbine tower flange via the suspension arrangement, and securing it to an inner wind turbine tower wall via interface arrangements.

The damper module chain may be secured to the inner wind turbine tower wall via second sets of fastening means configured for securing each of the damper modules of the chain in a radial direction of said tower section. As previous addressed the second sets of fastening means may comprise one or more magnetic fastening elements configured to secure the respective damper modules to the inside of the tower section wall which may be a tubular steel tower wall. Each of the one or more magnetic fastening elements may comprise a number of permanent magnets, such as 2 permanent magnets.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

The present invention will now be explained in further details with reference to the accompanying figures, wherein.

Figure 1:
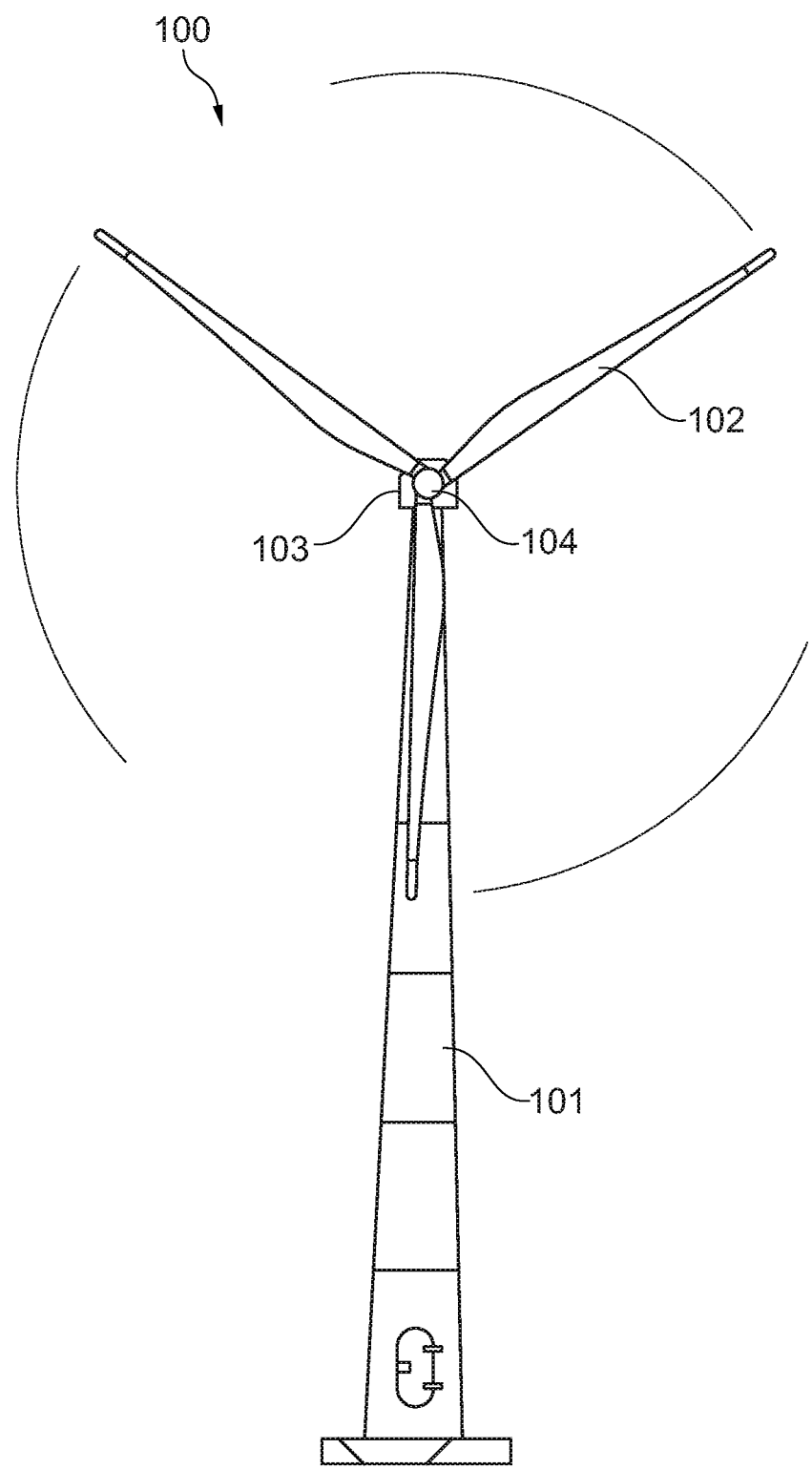
FIG. 1 shows a wind turbine generator, an assembled wind turbine tower.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In a general aspect the present invention relates to a damper in the form of a liquid damper for damping oscillations of an associated tower structure, such as a wind turbine tower, to which the liquid damper is attached. The present invention further relates to a damper module comprising at least one liquid damper secured to a frame structure. In order to reduce oscillations of an associated tower structure an appropriate number of damper modules may be installed in said associated tower structure.

Referring now to FIG. 1 a wind turbine generator 100 is depicted. The wind turbine generator 100 comprises a wind turbine tower 101, a nacelle 103 as well as three rotor blades 102 secured to a rotor hub 104. The wind turbine generator 100 converts wind energy into electrical energy via at least one power generator and an associated power converter system. The power generator and the associated power converter system are not shown in FIG. 1.

Figure 2:
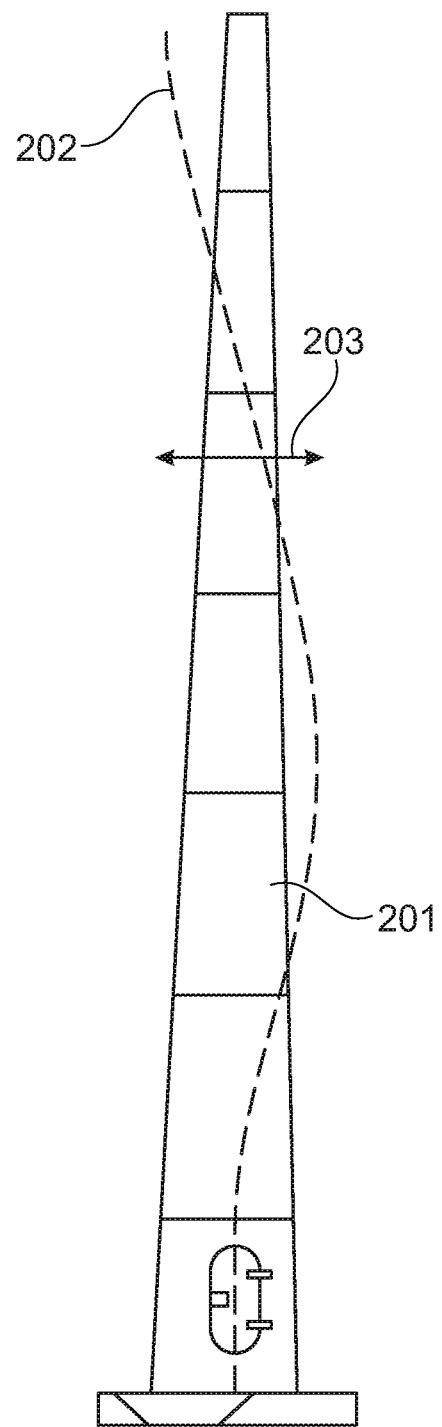
FIG. 2 shows an assembled wind turbine tower.

When assembling wind turbine generators of the type depicted in FIG. 1 the wind turbine tower 101 is assembled first, cf. FIG. 2. Prior to mounting the nacelle, the hub and the rotor blades on the wind turbine tower, the free-standing wind turbine tower 201 may be exposed to Vortex-induced oscillations which will cause the free standing wind turbine tower 201 to sway or deflect from side to side as indicated by the arrow 203 in FIG. 2. A free standing wind turbine tower having a nacelle installed thereon, the nacelle with or without rotor, may also sway or deflect from side to side. The tower damper of the present invention is therefore configured to be applied in wind turbine towers without a nacelle installed thereon as well as in wind turbine towers with a nacelle installed thereon, the nacelle with or without rotor.

As seen in FIG. 2 the wind turbine tower comprises a plurality of tower sections arranged on top of each other in order to form the complete wind turbine tower. Tower deflections in accordance with the second natural frequency of a tower structure are indicated by the dashed line 202 in FIG. 2. Not only completed wind turbine towers, but also wind turbine towers that have still not reached their final height may also sway or deflect if exposed to Vortex-induced oscillations.

Figure 3:
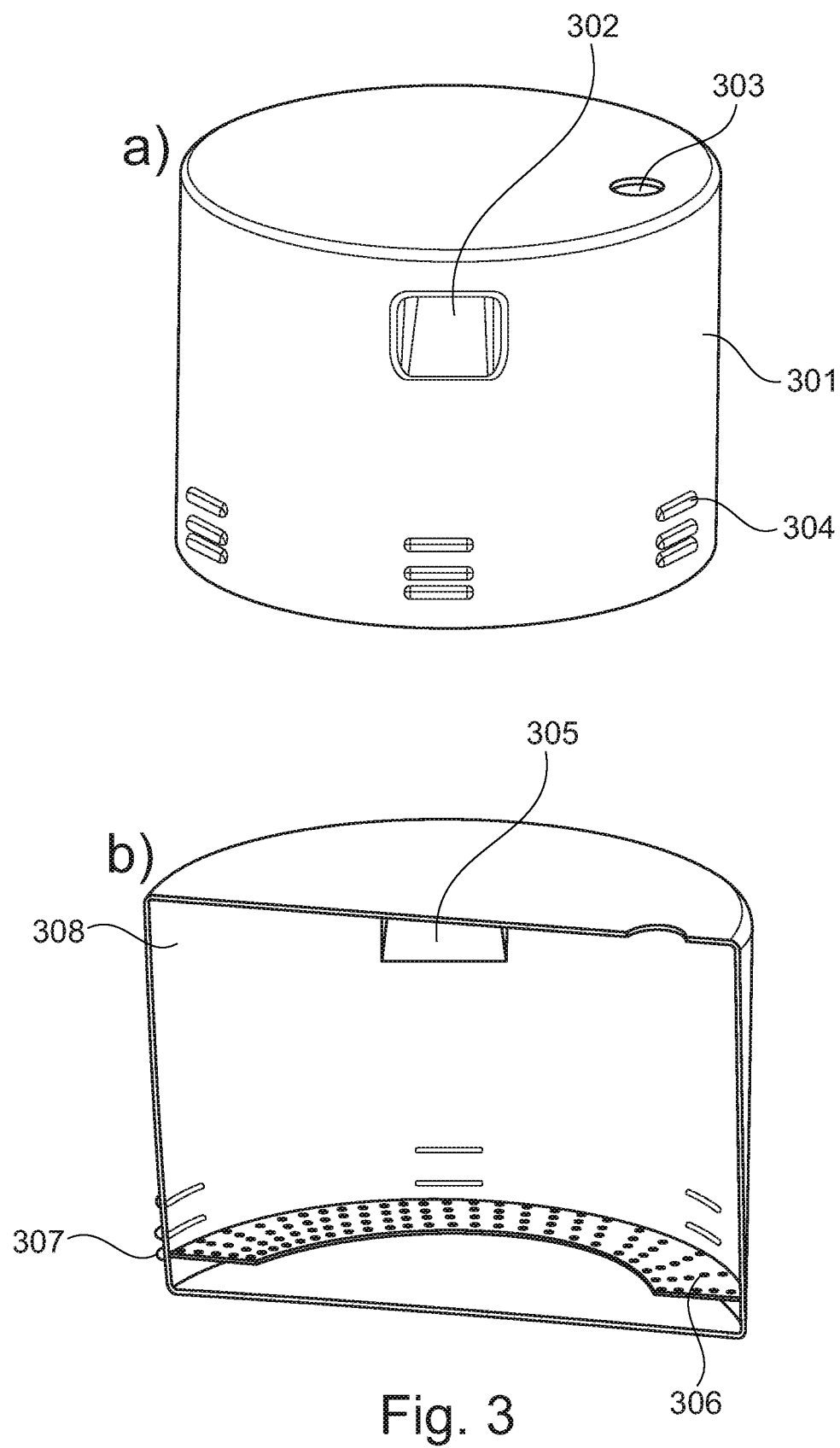
FIG. 3 shows a liquid damper.

Turning now to FIG. 3a a liquid damper according to the present invention is depicted. The liquid damper takes the form a moulded barrel 301 having a pair of oppositely arranged handles 302, 305 and an opening 303 for providing access to an interior volume 308, cf. FIG. 3b, of the moulded barrel 301. The opening 303 in the moulded barrel 301 facilitates that liquid may either enter or leave the interior volume 308. For given dimensions of the moulded barrel 301 the amount of liquid in the interior volume 308 of said moulded barrel 301 sets a natural frequency of the liquid damper. An appropriate closure arrangement (not shown), either permanent or temporary, is provided for closing the opening 303 when a desired amount of liquid is present in the interior volume 308 of the moulded barrel 301.

As depicted in FIGS. 3a and 3b one or more indents 304, 307 are embedded in the moulded barrel 301. The positioning of the one or more indents 304, 307 define the positioning of an embedded flow restraining element 306 in that the flow restraining element 306 is aligned with at least a number of said one or more indents 304, 307. As depicted in FIG. 3*b* the flow restraining element 306 is positioned at the lowest available position out of three allowable positions. The flow restraining element 306 takes the form of a ring-shaped element having a mesh of through-going passages as well as a central opening. Other implementations of the flow restraining element 306 may also be applicable.

The position of the flow restraining element 306 inside the barrel 301 depends on the height of the liquid inside the barrel 301. The flow restraining element 306 should be submerged in the liquid during operation of the damper and ideally just below the surface of the liquid. The indents in the embodiment shown allows three discrete heights of the flow restraining element 306. By introducing indents 304, 307 in more levels more tuning options are introduced.

The diameter and height of the moulded barrel 301 may be selected in view of the desired natural frequency of a liquid damper. As the natural frequency of the liquid damper 301 is typically below 5 Hz, such as between 0.5 Hz and 2 Hz, the diameter of the moulded barrel 301 may be between 0.2 m and 0.8 m, whereas the height of the moulded barrel may be between 0.1 m and 0.6 m. The overall weight of a liquid damper depends on its physical dimensions as well as the amount of liquid in its interior volume. Small liquid dampers may thus have an overall weight of less than 10 kg, whereas larger liquid dampers may have an overall weight above 40 kg.

According to the present invention 3 different dimensions of the liquid damper have been preselected—namely a large liquid damper having a natural frequency in the range 0.7-1.1 Hz, a medium size liquid damper having a natural frequency in the range 1.0-1.4 Hz, and a small liquid damper having a natural frequency in the range 1.2-1.7 Hz.

In terms of manufacturing, the moulded barrel 301 a rotational moulding technique may be applied. It should however be noted that other manufacturing techniques, including blow moulding, 3D printing or injection moulding, may also be applicable.

In order to provide sufficient damping of a tower structure, such as a wind turbine tower, the mass ratio between the mass of the tower structure and the total mass of a damper must be tuned to a certain value. In an embodiment of the present invention a plurality of liquid dampers, such as 4, 6 or 24, are grouped to form a damper module. As it will be demonstrated in the following 4 large liquid dampers may form a damper module of a first type, whereas 6 medium size liquid dampers may form a damper module of a second type. Finally, 24 small liquid dampers may be grouped to form a damper module of a third type.

Figure 4:
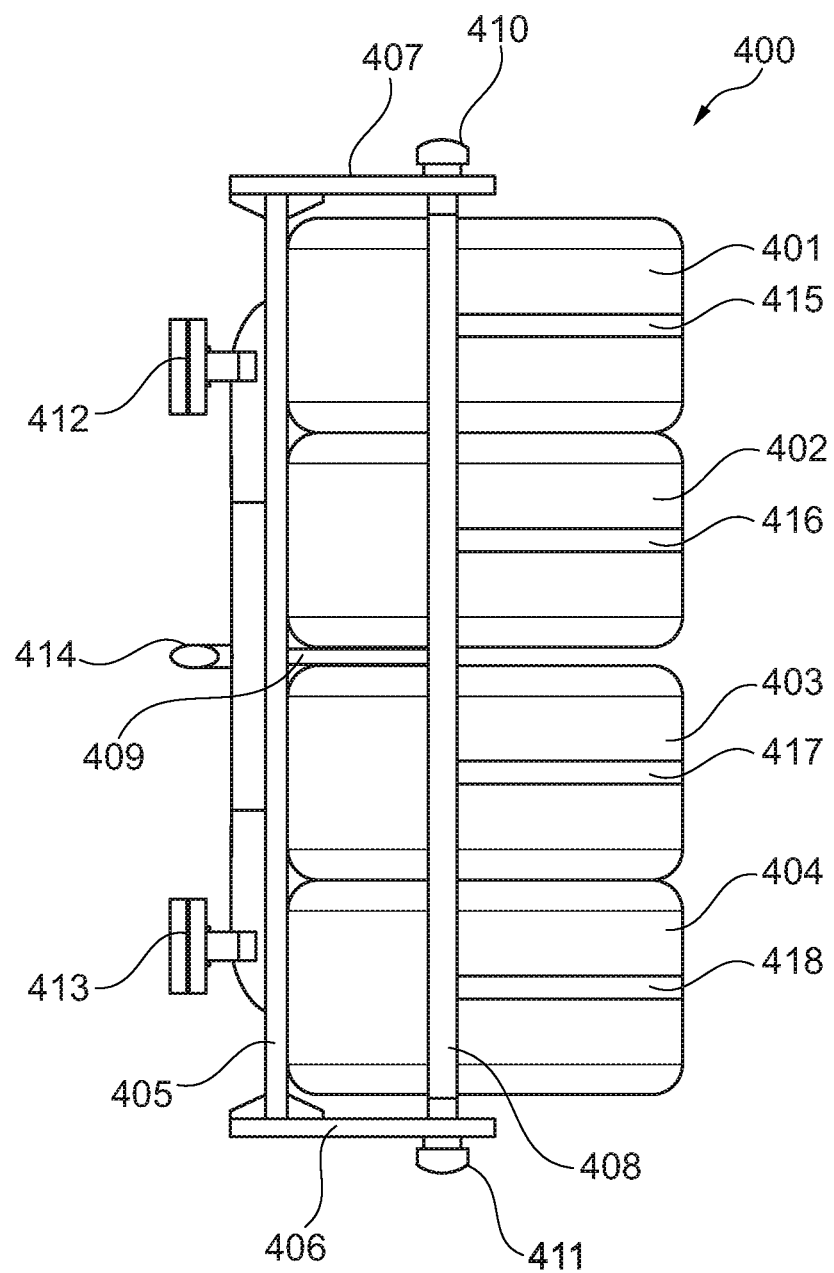
FIG. 4 shows a damper module of a first type.

Referring now to FIG. 4 a damper module 400 comprising 4 large liquid dampers 401-404 is depicted. The 4 large liquid dampers 401-404 have similar properties as to physical dimensions, weight as well as natural frequency. The natural frequency of the large liquid dampers is in the range 0.7-1.1 Hz. As depicted in FIG. 4 the 4 large liquid dampers 401-404 are secured via straps or belts 415-418 to a frame structure having a bottom portion 406, a top portion 407, a centre portion 409 and a side portion 408. For axial fixation of the damper module 400 within a tower structure the damper module 400 comprises a number, such as a pair, of eye bolts 410 for suspending the damper module 400 from for example a tower flange (not shown) or from another damper module (also not shown). Similarly, the damper module 400 comprises a number, such as a pair, of eye bolts 411 for suspending another damper module (not shown) from the damper module 400. For radial fixation of the damper module 400 a number of magnetic fastening elements 412, 413 are provided. As it will be disclosed in further details below the magnetic fastening elements 412, 413 will secure the damper module 400 to an inner tower structure wall (not shown). The damper module 400 may further comprise at least one handling eye 414 for easy handling of the damper module 400 prior to mounting the damper module 400 in a tower structure (not shown). It should be noted that the number of large liquid dampers in the damper module may be different from 4.

Figure 5:
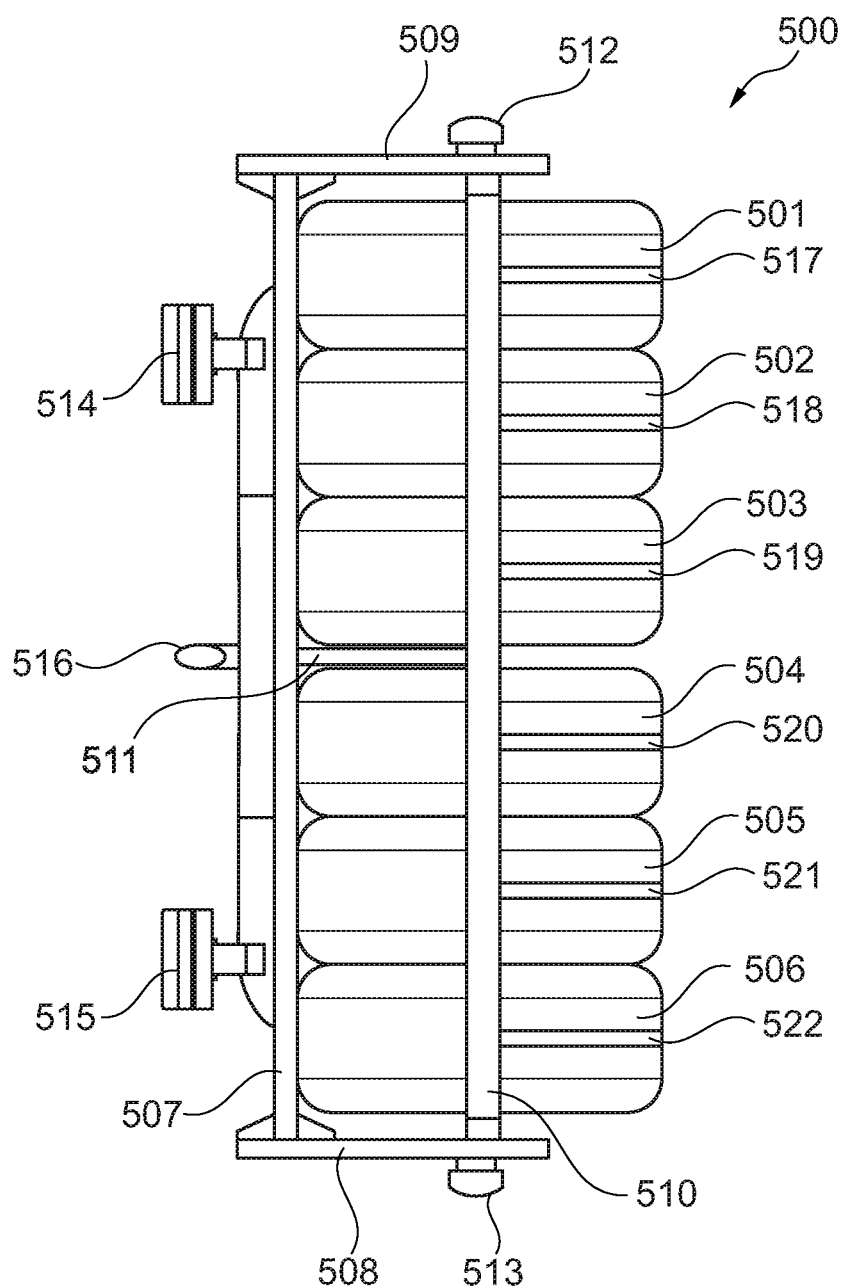
FIG. 5 shows a damper module of a second type.

In FIG. 5 a damper module 500 comprising 6 medium size liquid dampers 501-506 is depicted. Also, the medium size liquid dampers 501-506 have similar properties as to physical dimensions, weight as well as natural frequency. The natural frequency of the medium size liquid dampers is in the range 1.0-1.4 Hz. The 6 large liquid dampers 501-506 are secured via straps or belts 517-522 to a frame structure having a bottom portion 508, a top portion 509, a centre portion 511 and a side portion 510. For axial fixation of the damper module 500 within a tower structure the damper module 500 comprises a number, such as a pair, of eye bolts 512 for suspending the damper module 500 from for example a tower flange (not shown) or from another damper module (also not shown). Similarly, the damper module 500 comprises a number, such as a pair, of eye bolts 513 for suspending another damper module (not shown) from the damper module 500. For radial fixation of the damper module 500 a number of magnetic fastening elements 514, 515 are provided. As it will be disclosed in further details below the magnetic fastening elements 514, 515 will secure the damper module 500 to an inner tower structure wall (not shown). The damper module 500 may further comprise at least one handling eye 516 for easy handling of the damper module 500 prior to mounting the damper module 500 in a tower structure (not shown). It should be noted that the number of medium size liquid dampers in the damper module may be different from 6.

Figure 6:
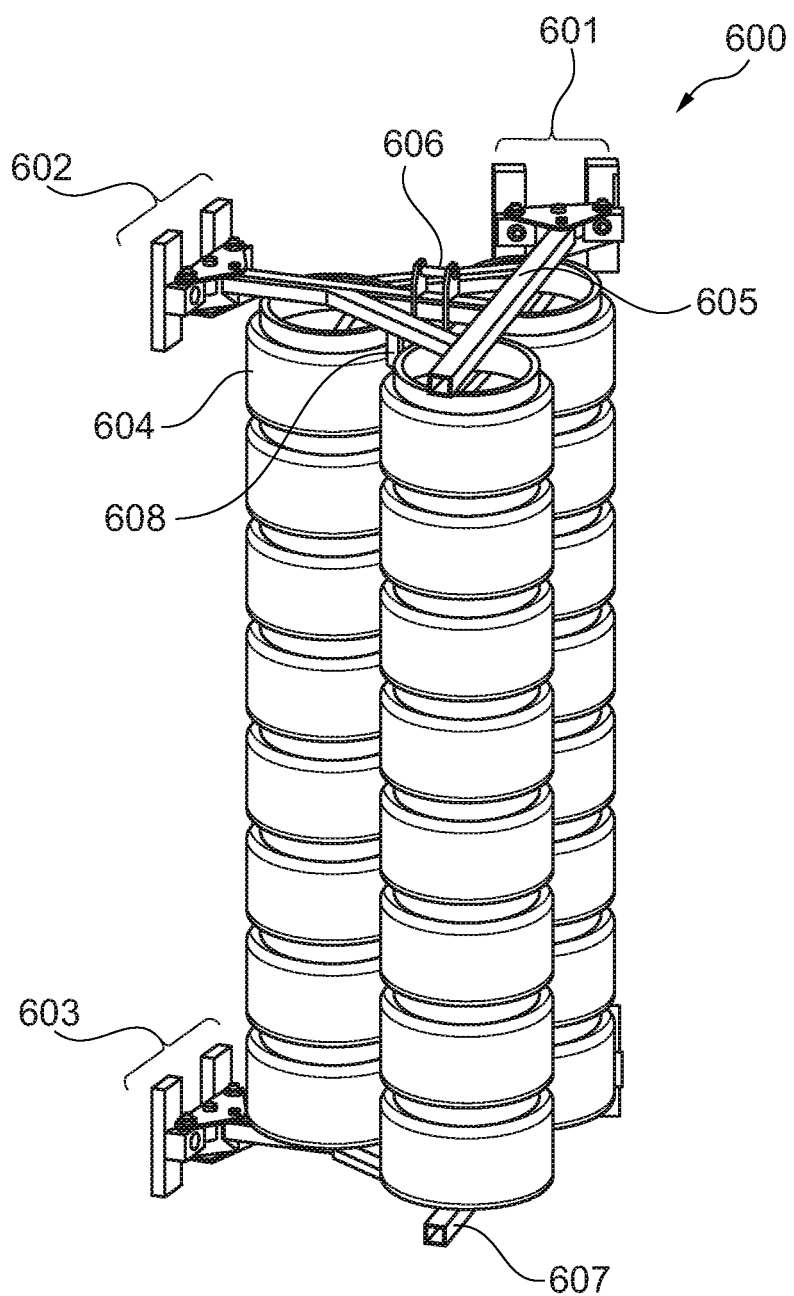
FIG. 6 shows a damper module of a third type.

Turning now to FIG. 6 a damper module 600 comprising 24 small liquid dampers 604 is depicted. The small liquid dampers 604 have similar properties as to physical dimensions, weight as well as natural frequency. The natural frequency of the small liquid dampers is in the range 1.2-1.7 Hz. The 24 small liquid dampers are secured to a frame structure having a bottom portion 607, a top portion 606 and 3 axial portions 608 (only one is visible). For axial fixation of the damper module 600 within a tower structure the damper module 600 comprises a number of fastening elements 606 for suspending the damper module 600 from for example a tower flange (not shown) or from another damper module (also not shown). Similarly, the damper module 600 comprises a number of fastening elements (not shown) for suspending another damper module (not shown) from the damper module 600. For radial fixation of the damper module 600 a number of magnetic fastening elements 601-603 are provided. As it will be disclosed in further details below the magnetic fastening elements 601-603 will secure the damper module 600 to an inner tower structure wall (not shown). The damper module 600 may further comprise at least one handling eye (not shown) for easy handling of the damper module 600 prior to mounting the damper module 600 in a tower structure (not shown). It should be noted that the number of small liquid dampers in the damper module may differ from 24.

Figure 7:
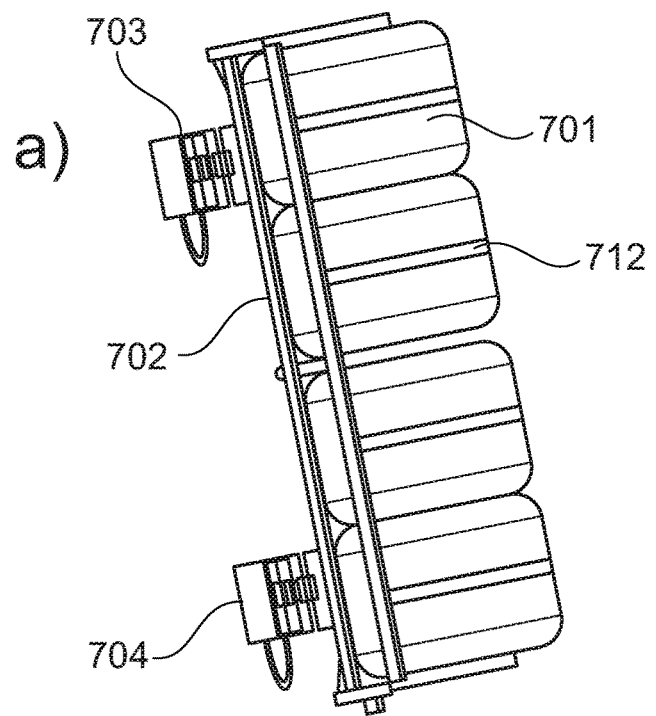
FIG. 7 shows a damper module of a first type and an enlarged depiction of magnetic fastening element.
Figure 7:
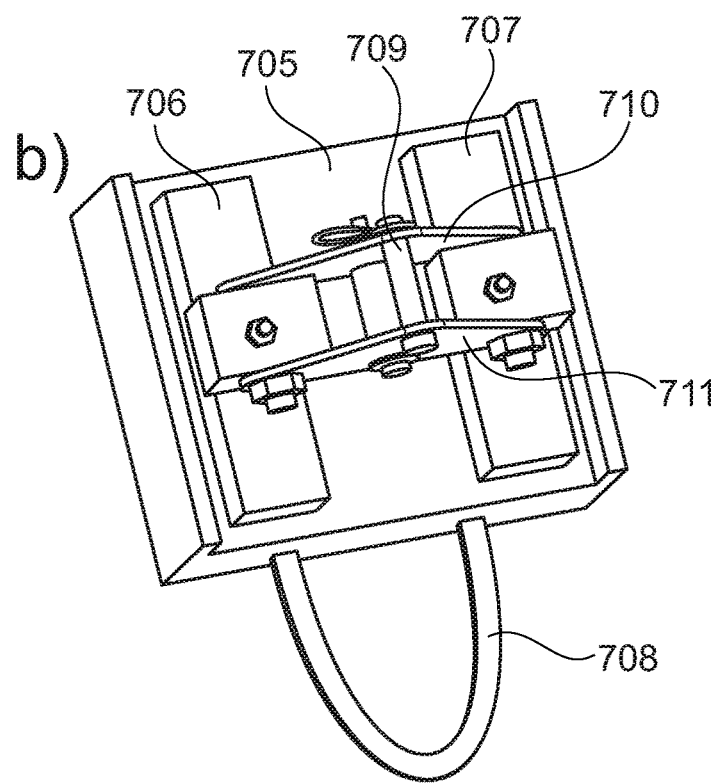

In FIG. 7*a* the damper module of FIG. 4 is depicted again, i.e. a damper module including 4 large liquid dampers 701 secured to a frame structure 702 via belts or straps 712. For radial fixation of the damper module a number of magnetic fastening elements 703, 704 are provided. FIG. 7*b* shows an enlarged view of a magnetic fastening element. As seen in FIG. 7b the magnetic fastening element comprises a pair of permanent magnets 706, 707 secured to a common frame element including frame plates 710, 711. The frame plates 710, 711 allow insertion of a split bolt 709 via which split bolt 709 the magnetic fastening element may be secured to a damper module for example of the type shown in FIG. 7a. A detachable protecting arrangement in the form of a non-magnetic housing 705 and a handle 708 is provided around the permanent magnets 706, 707 in order to prevent that these magnets unintentionally attach to other metal structures.

Figure 8:
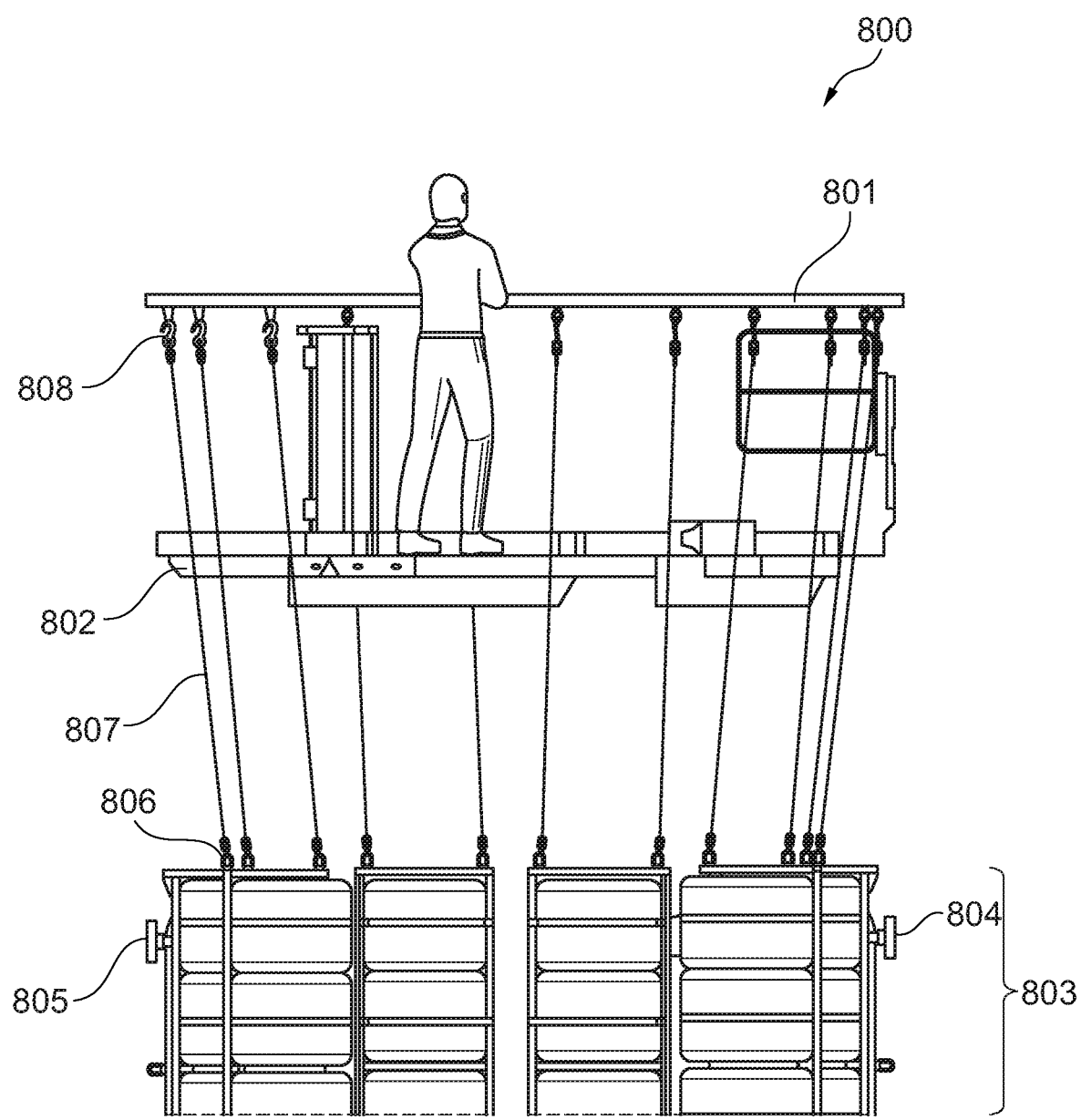
FIG. 8 shows suspended damper modules in a wind turbine tower.

Referring now to FIG. 8 a possible installation 800 of a plurality of damper modules in a wind turbine tower (not shown) is depicted. As seen in FIG. 8 a total of 6 damper modules 803 are suspended in respective wires 807 from a tower flange 801. Each damper module is suspended in 2 wires although only 11 wires are visible in FIG. 8. Each wire 807 is, at one end, secured to an eye bolt 806 of a damper module, whereas the other end of each wire is secured to the tower flange 801 via a detachable arrangement in the form of a hook 808. A tower platform 802 for service personal is situated between the tower flange 801 and the suspended damper modules 803. Service personal may thus assist in case damper modules are to be retrofitted in a wind turbine tower. As seen from FIG. 8 the wires 807 are responsible for the axial positioning and fixation of the damper modules 803. As previously discussed and as it will be demonstrated in connection with FIG. 9 magnetic fastening elements 804, 805 (only two are visible in FIG. 8) are responsible for the radial positioning and fixation of the damper modules 803.

Figure 9:
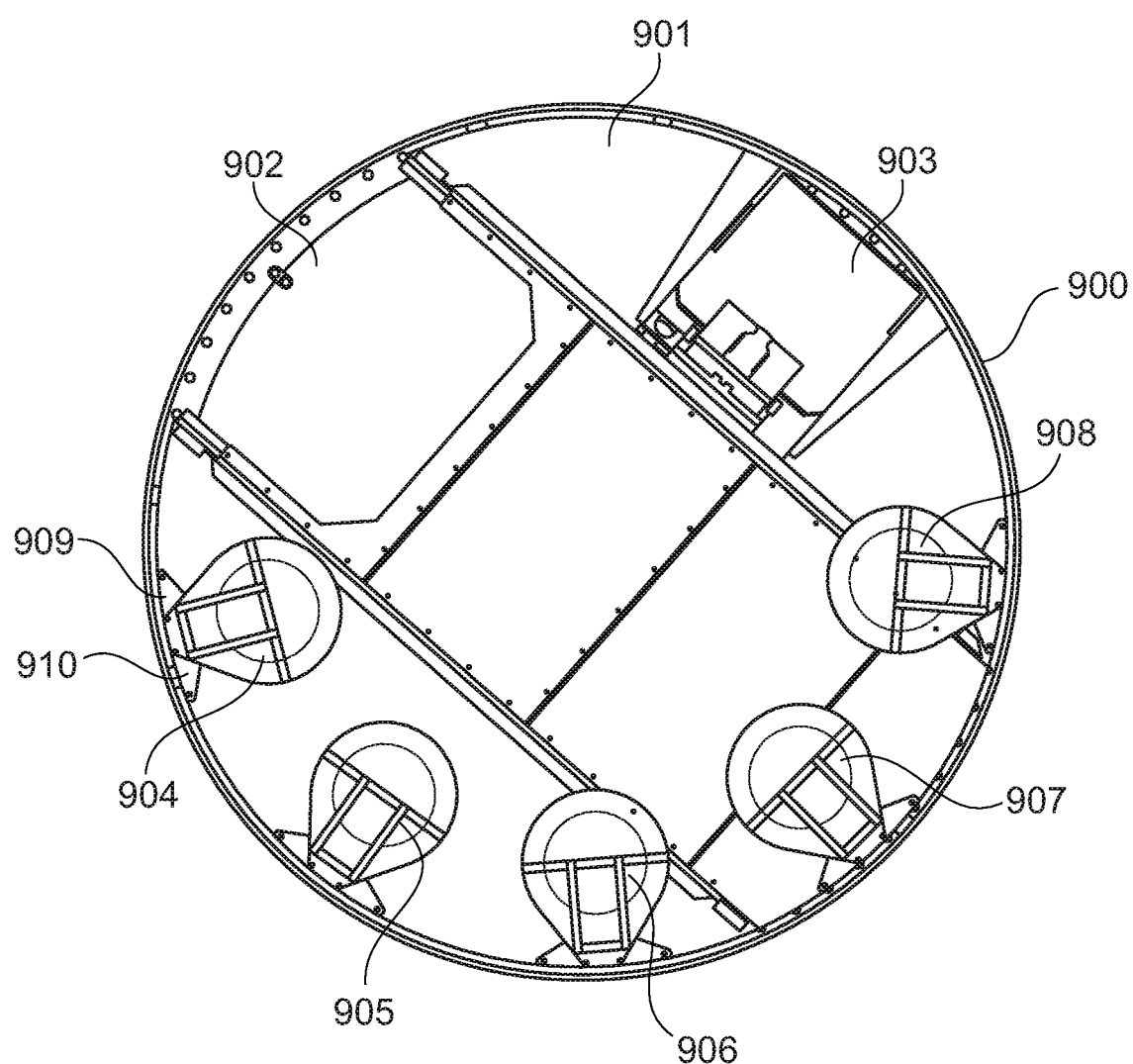
FIG. 9 shows damper modules secured to a wind turbine tower wall.

FIG. 9 shows a tower platform 901 of a wind turbine tower. The tower platform, which comprises a passage 902 for a tower elevator and a hatch 903 for a ladder, is viewed from below. The tower platform 901 is secured along its edge to the wind turbine tower wall 900. As the tower platform 901 is viewed from below the 5 damper modules 904-908 are positioned and fixated to the wind turbine tower wall 900 below the tower platform 901. Each damper module 904-908 is secured to the wind turbine tower wall 900 via an appropriate number of magnetic fastening elements 909, 910, such as 4 magnetic fastening elements per damper module. It should also be noted that the damper modules 904-908 are positioned off-centre relative to the wind turbine tower and away from the passage 902 and the hatch 903.

Figure 10:
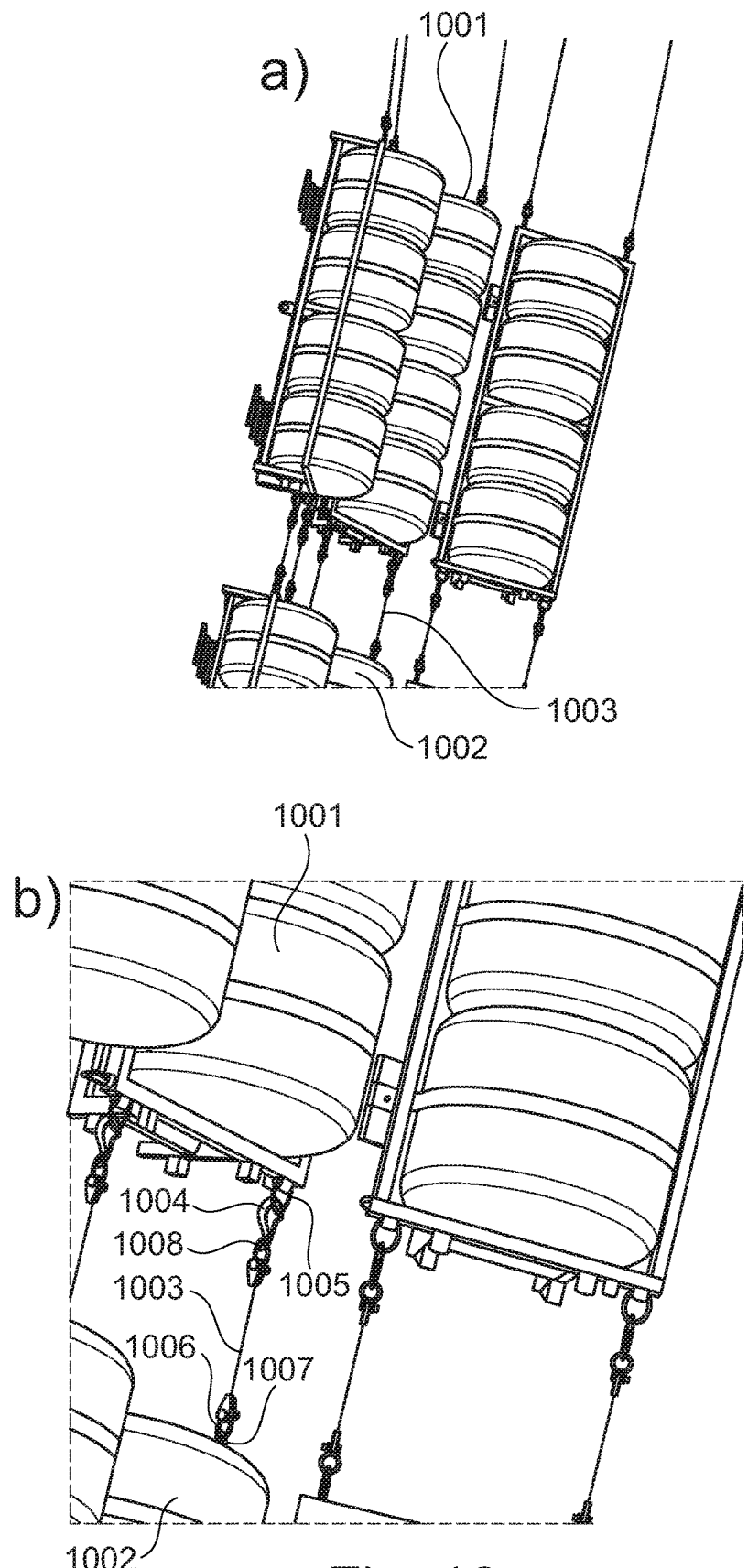
FIG. 10 shows suspended damper module chains.

As previously indicated a chain of damper modules may be provided by connecting a plurality of damper modules to each other. The number of damper modules forming the chain may in principle be arbitrary. As depicted in FIG. 10a a first damper module 1001 may be connected to a second damper module 1002 via at least one wire 1003. FIG. 10b shows an enlarged view of a portion of FIG. 10a. As shown in FIG. 10b each wire between two axially adjacent damper modules 1001, 1002 comprises a wire 1003 with shackles 1006, 1008 in both ends. The lower shackle 1006 is secured to the eye bolt 1007 of the lower damper module 1002, whereas the upper shackle 1008 is secured to a hook 1004 which is secured to an eye bolt 1005 of the upper damper module 1001.

Figure 11:
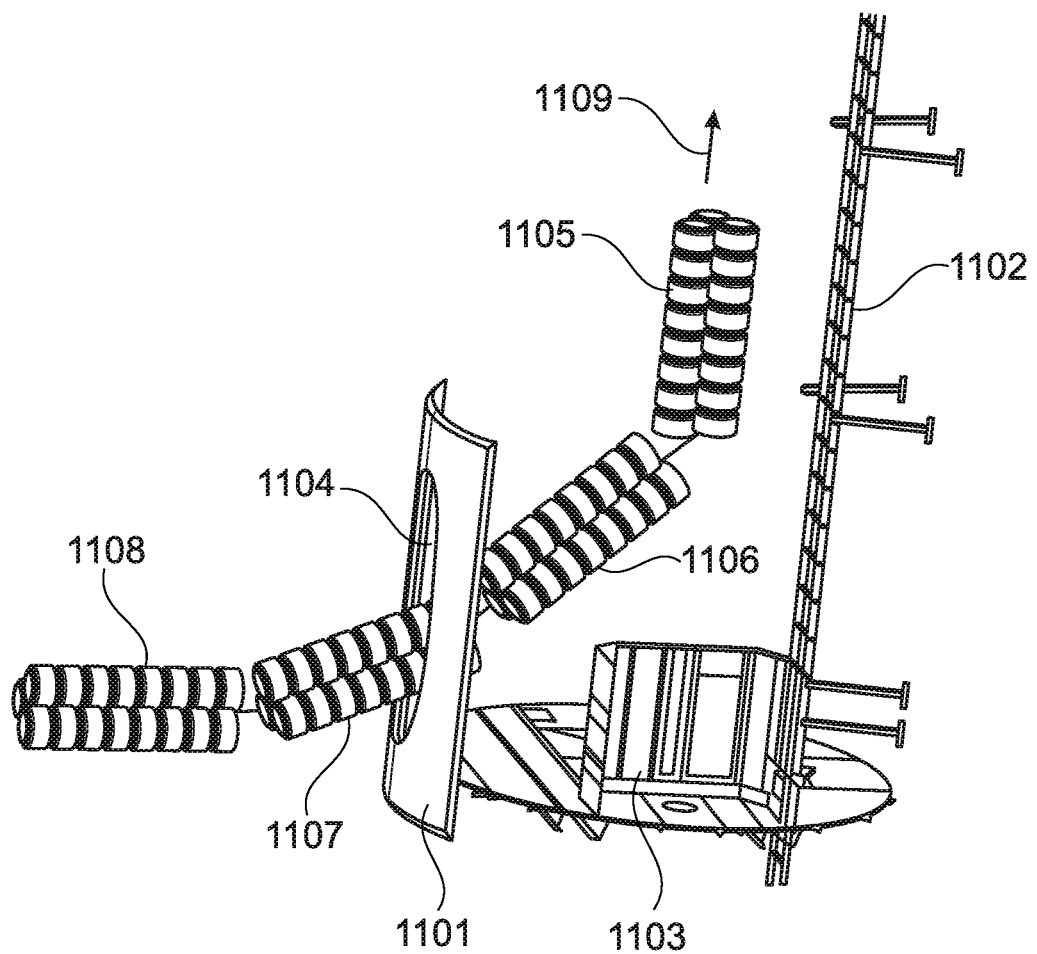
FIG. 11 shows retrofitting of a damper module chain.
Figure 12:
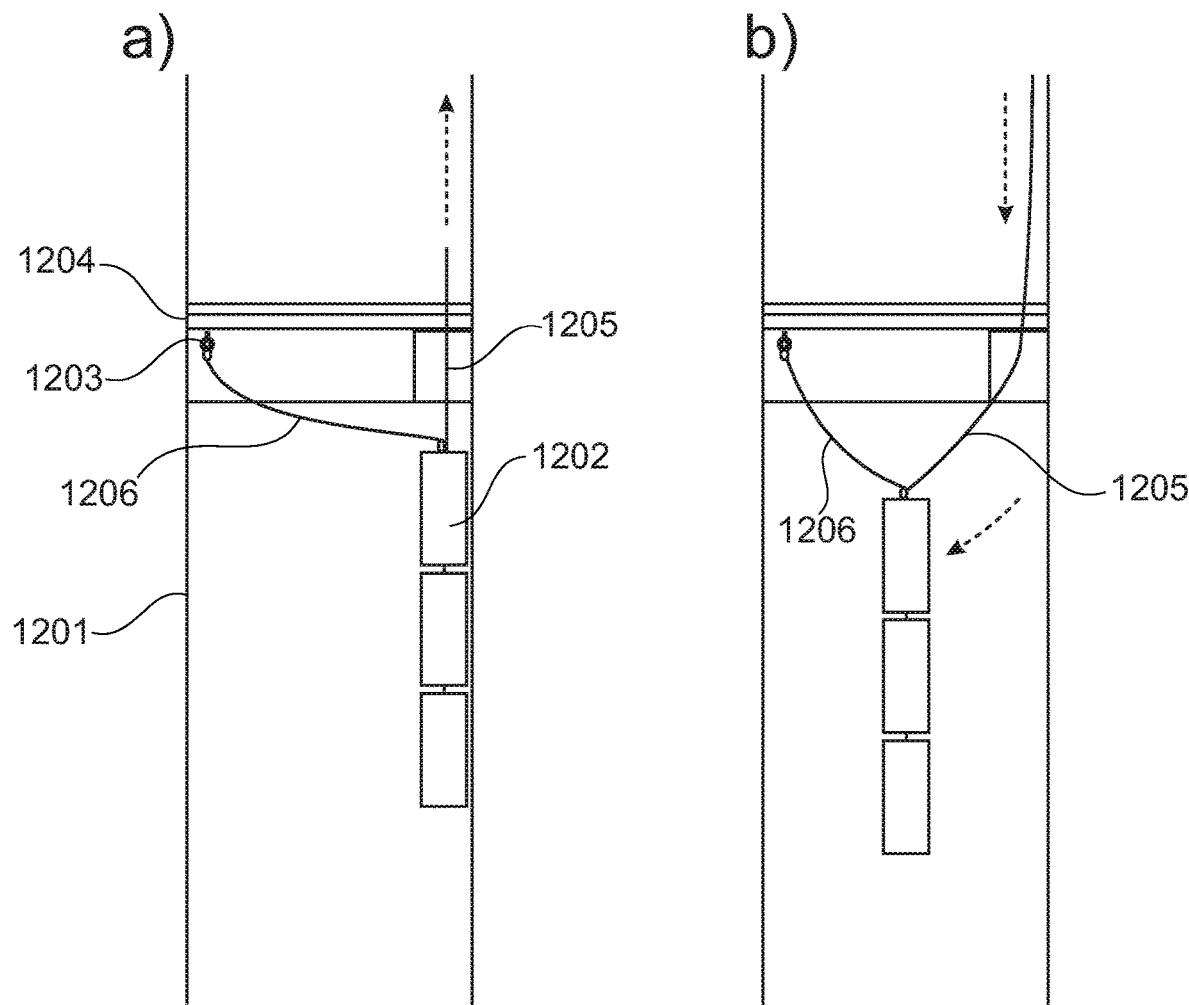
FIG. 12 shows load shifting of a retrofitted damper module chain.

FIGS. 11 and 12 both relate to retrofitting of damper modules arranged in one or more chains. FIG. 11 is a simple schematic of a chain of damper modules 1105-1108 to be hoisted as indicated by arrow 1109 inside a wind turbine tower (not shown) having a ladder 1102 and an elevator 1103 arranged therein. The damper modules 1105-1108 are interconnected by wires as previously discussed. Before being hoisted inside the wind turbine tower the damper module chain needs to pass the rather narrow entrance 1104 to the wind turbine tower. It should be noted that the damper modules 1105-1108, in an alternative embodiment, may be hoisted one by one instead of being hoisted as a chain.

In FIG. 12a a chain comprising three damper modules 1202 has been hoisted in a wire 1205 inside a wind turbine tower 1201 having a tower flange 1204. The final position in the chain of damper modules is intended to be below the eye bolt 1203 secured to the tower flange 1204. However, as the chain of damper modules 1202 has been hoisted at a position away from the eye bolt 1203 a load shifting process needs to take place in order to bring the chain of damper modules to its final position, cf. FIG. 12b. In FIG. 12b the final suspension wire 1206, or suspension wires, is/are tightened, whereas the hoisting wire 1205 is loosened whereby the chain of damper modules is shifted to the left, i.e. towards its final position below the eye bolt 1203. At its final position an appropriate number of magnetic fastening elements (not shown) secure the chain of damper modules to the inside of the wind turbine tower wall. Thus, by following the approach outlined in FIGS. 11 and 12 retrofitting of chains of damper modules becomes possible.

The invention claimed is:

1. A wind turbine tower comprising:
   a tower section forming an upper part of the wind turbine tower;
   a damper module including at least one liquid damper that includes a container comprising an interior volume containing an amount of liquid; and
   a frame structure including an interface arrangement that cooperates with a damper module suspension arrangement to secure the damper module to the tower section, the frame structure further including a liquid damper fastening arrangement for securing the at least one liquid damper to the frame structure,
   wherein the amount of liquid in the interior volume of the container sets a natural frequency of the liquid damper, and
   wherein the container is fixed a radial distance from an inner tower section wall and wherein the container remains at that radial distance when the wind turbine tower oscillates.

2. The wind turbine tower according to claim 1, wherein the interface arrangement comprises a first set of fastening means for securing the damper module relative to the tower section in an axial direction of the tower section.

3. The wind turbine tower according to claim 2, wherein the first set of fastening means comprises one or more eye bolts.

4. The wind turbine tower according to claim 1, wherein the interface arrangement comprises a second set of fastening means for securing the damper module relative to the tower section in a radial direction of the tower section.

5. The wind turbine tower according to claim 4, wherein the second set of fastening means comprise one or more magnetic fastening elements configured to secure the damper module to an inside of a wall of the tower section.

6. The wind turbine tower according to claim 1, wherein the interface arrangement further comprises a third set of fastening means for attaching an axially adjacent damper module to the damper module in a manner so that the axially adjacent damper module is suspended from the damper module in the axial direction of the tower section.

7. The wind turbine tower according to claim 6, wherein the third set of fastening means comprises one or more eye bolts.

8. The wind turbine tower according to claim 1, wherein a plurality of liquid dampers are secured to the frame structure, and wherein the plurality of liquid dampers have essentially the same natural frequency.

9. The wind turbine tower according to claim 8, wherein the natural frequency of the plurality of liquid dampers is below 5 Hz.

10. The wind turbine tower according to claim 1, wherein the tower section includes a tubular tower wall and upper and lower.

11. The wind turbine tower according to claim 10, wherein the damper module is positioned adjacent the tower wall on an inside of the tower section.

12. The wind turbine tower according to claim 10, wherein the damper module suspension arrangement comprises an elongated element, wherein the elongated element is attachable to the interface arrangement, and attachable to connection points on the tower section.

13. The wind turbine tower according to claim 12, wherein the connection points on the tower section are formed on the inside of the tower wall of the tower section, on the upper flange of the tower section, or on a tower platform suspended within the tower section.

14. The wind turbine tower according to claim 1, wherein the container further includes at least one embedded flow restraining element arranged within the interior volume.

15. The wind turbine tower according to claim 14, wherein the natural frequency of the at least one liquid damper is below 5 Hz.

16. The wind turbine tower according to claim 14, wherein at least one indent is provided within the interior volume of the container, and wherein the positioning of the at least one embedded flow restraining element is aligned with the at least one indent.

17. The wind turbine tower according to claim 1, wherein the container is a one-piece moulded barrel.

18. The wind turbine tower according to claim 1 further comprising a plurality of mutually connected damper modules, wherein axially adjacent damper modules are mutually connected via at least one elongated element.

19. The wind turbine tower according to claim 18, wherein the tower section has at least one damper module chain secured thereto.

20. A method for installing a damper module chain in an installed wind turbine tower, the method comprising:
hoisting the damper module chain to a predetermined height inside the wind turbine tower using a hoisting arrangement secured to an interface arrangement of a frame structure,
load shifting the hoisted damper module chain from the hoisting arrangement to a damper module suspension arrangement also secured to the interface arrangement at one end, and secured to a wind turbine tower flange at another end, wherein the damper module suspension arrangement is secured to the wind turbine tower flange at a connection point which is above and vertically aligned with a final position of the damper module chain, and
bringing, using the damper module suspension arrangement, the damper module chain to its final vertical position, and securing the damper module chain to the wind turbine tower flange via the damper module suspension arrangement, and securing the damper module chain to an inner wind turbine tower wall via interface arrangements,
wherein the damper module chain includes at least one container comprising an interior volume containing an amount of liquid, wherein the at least one container is fixed a radial distance from an inner tower section wall and wherein the container remains at that radial distance when the wind turbine tower oscillates.

* * * * *